(12) United States Patent
Katoh et al.

(10) Patent No.: US 7,308,585 B2
(45) Date of Patent: Dec. 11, 2007

(54) LOW POWER RESIDUAL REMAINING POWER INDICATOR

(75) Inventors: Takayuki Katoh, Yokohama (JP); Kohhei Shibata, Fujisawa (JP); Reiko Ohtani, Kawasaki (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 336 days.

(21) Appl. No.: 10/424,226

(22) Filed: Apr. 25, 2003

(65) Prior Publication Data

US 2004/0128570 A1 Jul. 1, 2004

(30) Foreign Application Priority Data

Apr. 26, 2002 (JP) .............................. 2002-127361

(51) Int. Cl.
*G06F 1/00* (2006.01)
(52) U.S. Cl. .......................... 713/300; 713/1; 713/320; 710/14
(58) Field of Classification Search ................ 713/300, 713/310, 320, 321, 323, 324, 1; 710/14
See application file for complete search history.

(56) References Cited

U.S. PATENT DOCUMENTS

| | | | | |
|---|---|---|---|---|
| 5,471,621 A | * | 11/1995 | Ohtsuki ...................... 713/323 |
| 5,717,900 A | * | 2/1998 | Whittaker .................... 711/151 |
| 5,754,853 A | * | 5/1998 | Pearce ........................... 713/2 |
| 6,254,249 B1 | * | 7/2001 | Kim et al. ................... 362/109 |
| 6,367,074 B1 | * | 4/2002 | Bates et al. .................. 711/170 |
| 6,487,669 B1 | * | 11/2002 | Waring ........................ 713/324 |
| 2002/0023182 A1 | * | 2/2002 | Jacobs et al. .................. 710/14 |
| 2003/0126480 A1 | * | 7/2003 | Song ........................... 713/300 |
| 2005/0040773 A1 | * | 2/2005 | Lebens et al. ............... 315/291 |

FOREIGN PATENT DOCUMENTS

| | | |
|---|---|---|
| JP | 56-011540 | 2/1981 |
| JP | 01-205310 | 8/1989 |
| JP | 02-219086 | 8/1990 |
| JP | 03-240816 | 10/1991 |
| JP | 04-337816 | 11/1992 |
| JP | 05-55453 | 7/1993 |
| JP | 07-25415 | 5/1995 |
| JP | 08-272497 | 10/1996 |
| JP | 08-321760 | 12/1996 |
| JP | 3048793 | 3/1998 |
| JP | 2000-354191 | 12/2000 |
| JP | 2001-195150 | 7/2001 |

* cited by examiner

*Primary Examiner*—Chun Cao
*Assistant Examiner*—Malcolm D Cribbs
(74) *Attorney, Agent, or Firm*—Anthony M. Del Zoppo, III; Driggs, Hogg & Fry Co., LPA

(57) ABSTRACT

Provided is an information processing apparatus that performs a desired process by a user while preserving a low consumption power state. The information processing apparatus comprises an electric power button for starting operation of an operating system when receiving an input from the user, a controller part for receiving an input to a switch other than the electric power button in an operation termination state in which the operation of the operating system is terminated, an execution part for executing a predetermined processing while preserving the operation termination state when the input to the switch is accepted by the controller part in the operation termination state.

20 Claims, 6 Drawing Sheets

|   | 300a | 300b | 300c | 300d | 300e |
|---|---|---|---|---|---|
| Residual amount of battery | Disk status | Number lock | Caps lock | Scroll lock | Power source |
| 5% or less | Off | Off | Off | Off | Off |
| 5 – 20% | On | Off | Off | Off | Off |
| 20 – 40% | On | On | Off | Off | Off |
| 40 – 60% | On | On | On | Off | Off |
| 60 – 80% | On | On | On | On | Off |
| 80% or more | On | On | On | On | On |

FIG. 6

LOW POWER RESIDUAL REMAINING POWER INDICATOR

BACKGROUND OF THE INVENTION

The present invention relates to an information processing apparatus and a control method. More particularly, the invention relates to an information processing apparatus and a control method for processing the information in response to an input from a user.

An information processing apparatus has been proposed which displays a residual amount of battery, adjusts the output volume and lights a projector to the keyboard in response to input from a user.

However, the information processing apparatus could perform the processings only in a state where the power of the apparatus was turned on. Accordingly, the user was required to turn on the power and wait for the initiation of the operating system to perform the processings.

Thus, it is a purpose of the invention to provide an information processing apparatus and a control method in which the above-mentioned problems can be solved. This purpose is accomplished by combination of features as defined in independent claims in the scope of claims. Also, the dependent terms define preferable examples of the invention.

SUMMARY OF THE INVENTION

According to a first embodiment of the present invention, there is provided an information processing apparatus and a control method for controlling the information processing apparatus, in which the information processing apparatus comprises an electric power button for starting operation of an operating system when receiving input from a user, a controller part for receiving an input to a switch other than the electric power button in an operation termination state in which the operation of the operating system is terminated, an execution part for executing a predetermined processing while preserving the operation termination state when the input to the switch is accepted by the controller part in the operation termination state.

According to a second embodiment of the invention, there is provided an information processing apparatus and a control method for controlling the information processing apparatus, in which the information processing apparatus comprises a processor part for executing operation of an operating system, a keyboard having a plurality of keys, an input part or inputter for accepting inputs to the plurality of keys, and a controller part for accepting an input to a predetermined key in an operation termination state in which operation of the processing part and the input part is terminated and turning the input part into an operation state while preserving the processor part in the operation termination state.

According to a third embodiment of the invention, there is provided an information processing apparatus comprising a keyboard having a plurality of keys, a display unit for displaying an image, a connection part for connecting the keyboard and the display unit that can be opened or closed, in which the plurality of keys are hidden by the display unit in a closed state in which the keyboard and the display unit are closed, and the plurality of keys are not hidden by the display unit to be available for input to the user in an open state in which the keyboard and the display unit are opened, and a controller part for lighting a projector indicating the position of at least one key among the plurality of keys when the connection part is turned from the closed state to the open state.

The above summary of the invention does not enumerate all of the necessary features for the present invention, but some combinations of these features may be also inventive features.

BRIEF DESCRIPTION OF THE DRAWINGS

Some of the purposes of the invention having been stated, others will appear as the description proceeds, when taken in connection with the accompanying drawings, in which:

FIG. 6 is a table listing a residual amount of battery that an execution part 230 indicates with a keyboard 300.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention will be described below using the preferred embodiments. The embodiments do not limit the invention as defined in claims, or all the combinations of features as described in the embodiments are not requisite for solving means of the invention.

Figure 1:
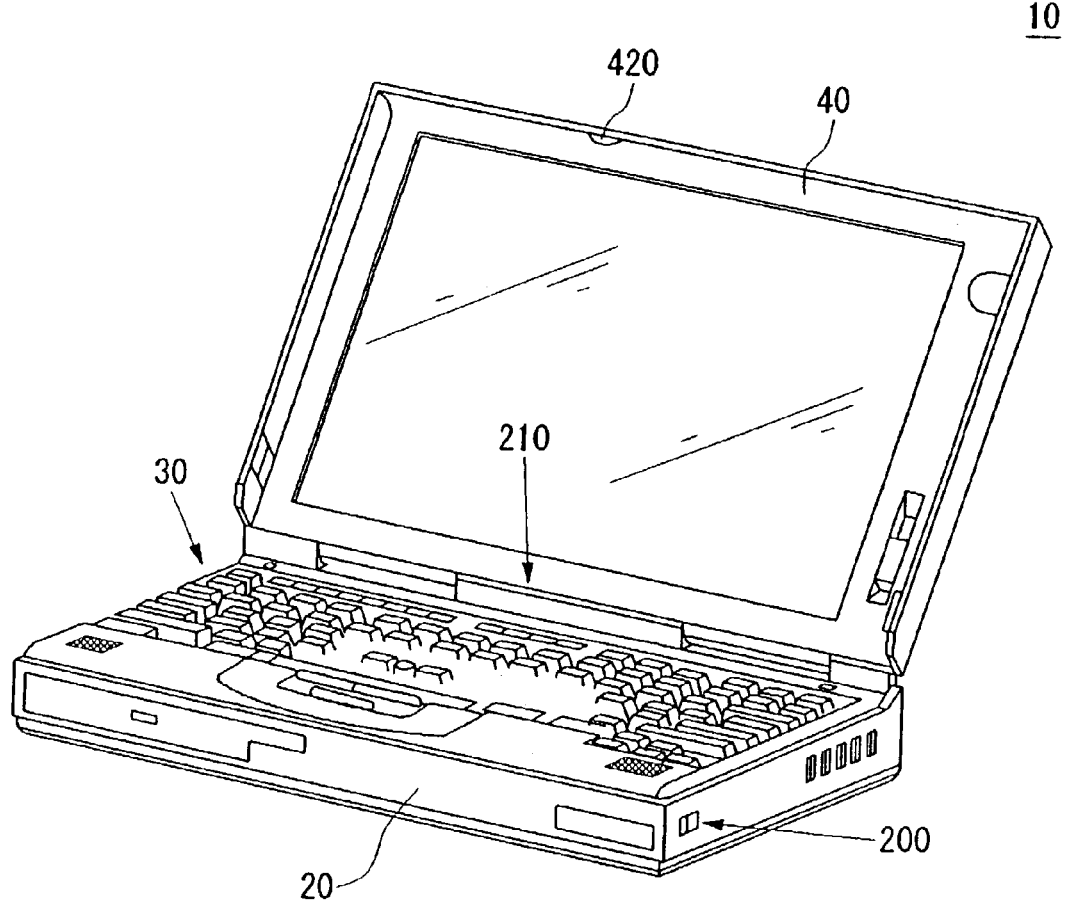
FIG. 1 is a schematic view of an information processing apparatus 10.

Referring now more particularly to the accompanying drawings, FIG. 1 is a schematic view of an information processing apparatus 10. The information processing apparatus 10 comprises a main unit 20 for processing the information, a keyboard 30 having a plurality of keys, a display unit 40, and a connection part 210 for connecting the keyboard 30 and the display unit 40 that can be opened or closed. The main unit 20 has an electric power button 200. The display unit 40 has a keyboard projector 420 for illuminating the keyboard 30.

In the connection part 210, a plurality of keys are hidden by the display unit 40 in a closed state in which the keyboard 30 and the display unit 40 are closed or mated, and the plurality of keys are not hidden by the display unit 40 to be available for input to the user in an open state in which the keyboard 30 and the display unit 40 are opened or separated.

The information processing apparatus 10 starts operation of the operating system, upon accepting an input to the electric power button 200 from the user. Also, the information processing apparatus 10 executes the predetermined processings while preserving the operation termination state, including a processing for lighting a keyboard projector 420, a processing for lighting an emission device indicating the position of the electric power button, and a processing for indicating a residual amount of battery to drive the information processing apparatus 10, in response to an operation of the user. Thereby, the information processing apparatus 10 provides the information to support the operation of the user or increase the availability for the user, while keeping a low power consumption in the operation termination state.

Figure 2:
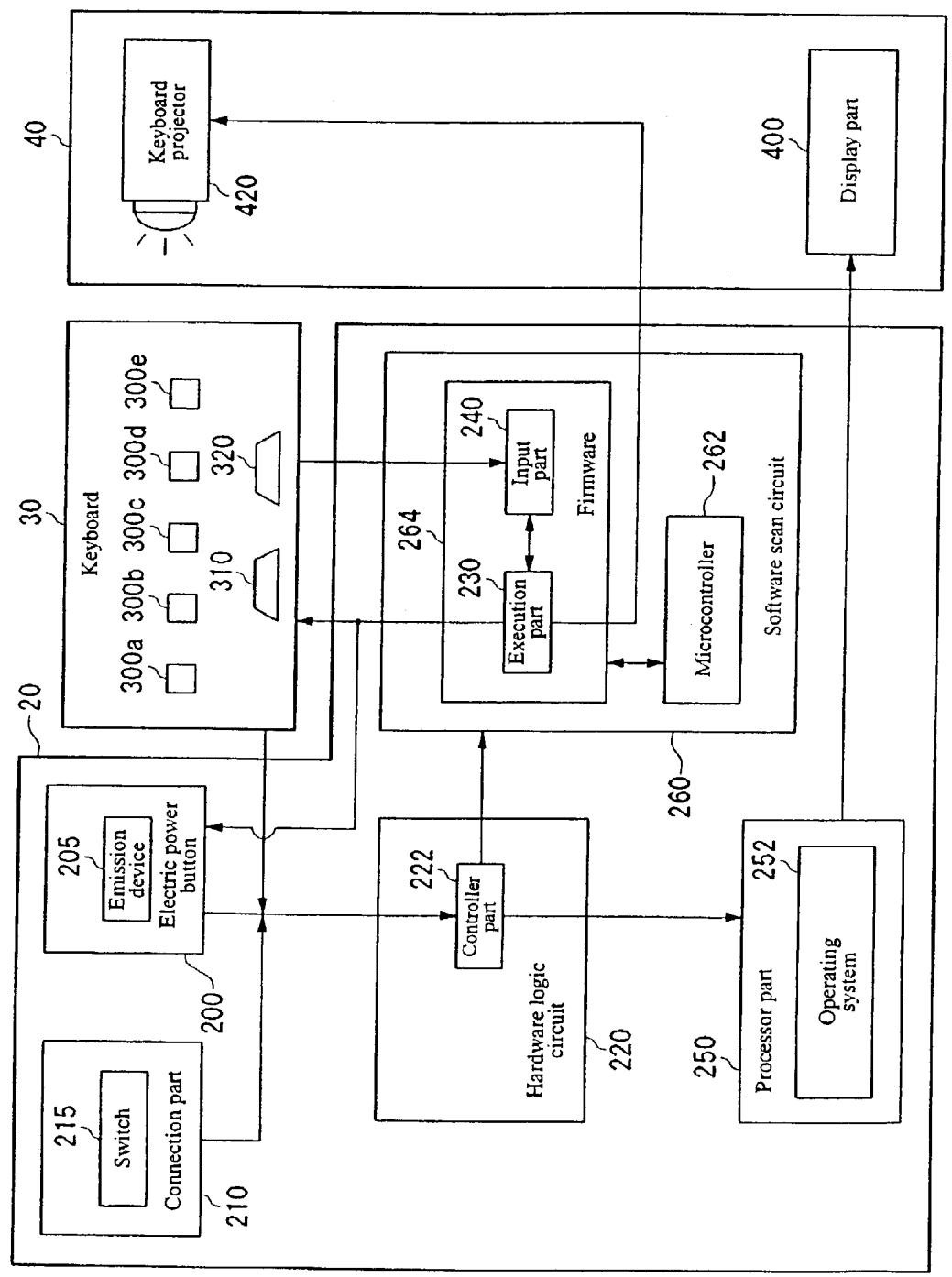
FIG. 2 is a functional block diagram of the information processing apparatus 10.

FIG. 2 is a functional block diagram of the information processing apparatus 10. The information processing apparatus 10 comprises the main unit 20, the keyboard 30 and the display unit 40. The main unit 20 has the electric power button 200, the connection part 210, a hardware logic circuit 220, a processor part 250, and a software scan circuit 260. The keyboard 30 comprises the keyboard emission devices 300a to 300e indicating the depressed state of a predetermined key, a function extension key 310 as the first key, and a function key 320 as the second key. The function extension key 310 is one example of a switch according to this invention. The display unit 40 comprises a display unit 400 and a keyboard projector 420.

The electric power button 200 comprises an emission device 205 indicating the position of the electric power button 200. The connection part 210 comprises a switch 215. The hardware logic circuit 220 comprises a controller part 222. The processor part 250 comprises an operating system 252, and executes the processes of the operating system 252. The software scan circuit 260 comprises a microcontroller 262 and a firmware 264. The firmware 264 comprises an execution part 230 and an input part 240. In more detail, the firmware 264 comprises an execution module and an input module, and enables the microcontroller 262 to be operated as the execution part 230 and the input part 240. The firmware 264 may be a non-volatile recording medium such as CMOS, SRAM or ROM storing the program or data.

The electric power button 200 starts the supply of electric power to the information processing apparatus 10 in response to an input from the user. That is, the electric power button 200 sends the information signifying that the input from the user is accepted to the controller part 222. The connection part 210 detects the information as to the open or closed state of the connection part 210 using the switch 215. The function extension key 310 accepts the inputs from the user.

The controller part 222 starts the supply of electric power to the processor part 250 or the software scan circuit 260 in accordance with the information received from the electric power button 200, the connection part 210 or the function extension key 310. Also, the controller part 222 sends an instruction to the processor part 250 or the software scan circuit 260 depending on a detection result of whether or not any external power source (AC adapter, etc.) for operating the information processing apparatus 10 is connected.

The processor part 250 executes the processes of the operating system 252, and displays the image on the display part 400, as needed.

The software scan circuit 260 enables the execution part 230 and the input part 240 to perform the following processes, employing the microcontroller 262 or the firmware 264. The execution part 230 performs a processing for lighting the keyboard projector 420 and the emission device 205 for a predetermined time in response to an instruction from the controller part 222. On the other hand, the input part 240 detects the depressed states of a plurality of keys on the keyboard 30 in response to an instruction from the controller part 222. When the input part 240 detects that the predetermined keys (e.g., both the function extension key 310 and the function key 320) are depressed, the execution part 230 detects a residual amount of battery. And the execution part 230 lights the keyboard emission devices 300a to 300e in accordance with the residual amount of battery.

Figure 3:
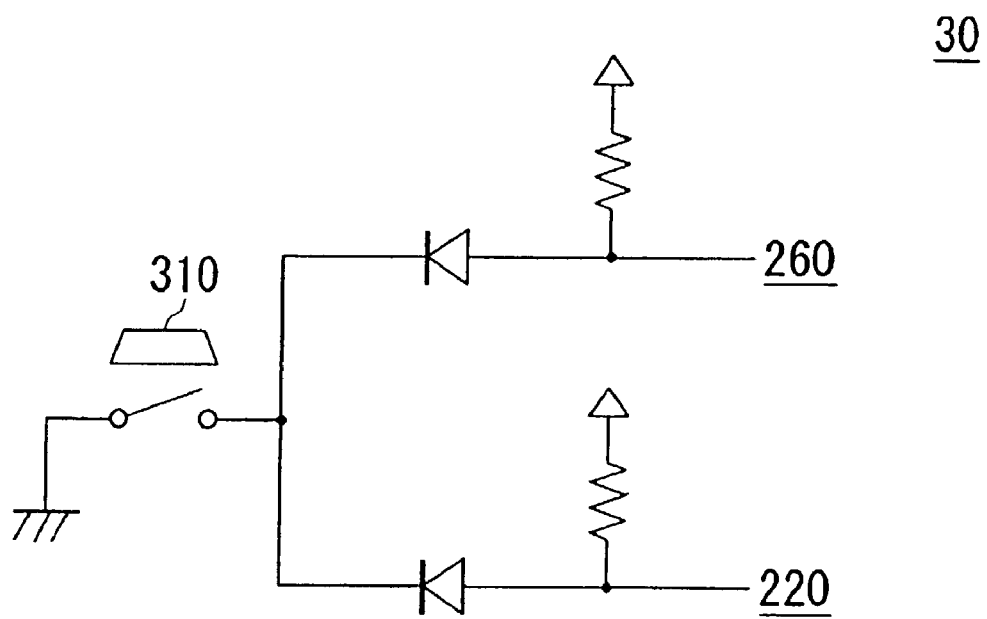
FIG. 3 is a circuit diagram showing an example of connection relationship of a hardware logic circuit 220, a software scan circuit 260 and a function extension key 310.

FIG. 3 is a circuit diagram showing an example of connection relation of the hardware logic circuit 220, the software scan circuit 260 and the function extension key 310. The hardware logic circuit 220 is a logic circuit implemented by a gate array, for example, or may be an analog circuit converter. The function extension key 310 is a switch that is turned on in the depressed state, and connected to each of the hardware logic circuit 220 and the software scan circuit 260. The hardware logic circuit 220 detects whether or not the function extension key 310 that is any one in part of a plurality of keys on the keyboard 30 is depressed. The hardware logic circuit 220 detects that the function extension key 310 is depressed on the basis of a change in the voltage, but may detect it on the basis of a voltage height or amplitude. On the other hand, the software scan circuit 260 detects the depressed state of the plurality of keys including the function extension key 310. The software scan circuit 260 detects the depressed state of the keys periodically through the software processing.

In this manner, both the software scan circuit 260 and the hardware logic circuit 220 detect the depressed state of the function extension key 310. Therefore, the information processing apparatus 10 allows the depressed state of the function extension key 310 to be detected by the hardware logic circuit 220 even when no electric power is supplied to the software scan circuit 260.

Figure 4:
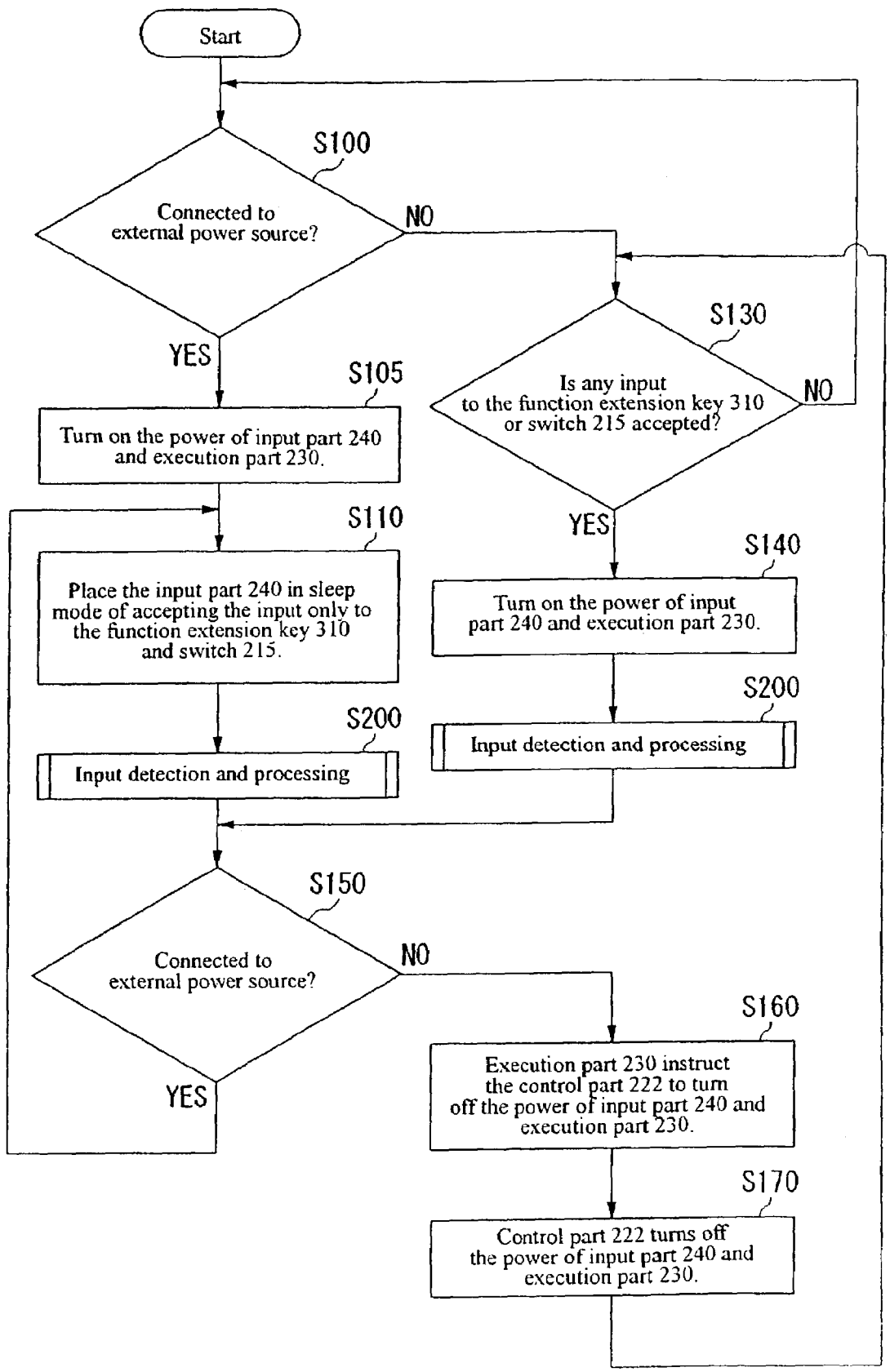
FIG. 4 is a flowchart of the information processing apparatus 10.

FIG. 4 is a flowchart of the information processing apparatus 10. Referring to FIG. 4, the operation of the information processing apparatus 10 in the operation termination state where the operating system is not operating will be described below.

Herein, the operation termination state is the state before depressing the electric power button. For example, the operation termination state may be the suspended state in which the execution of the operating system is terminated in a restart capable condition, with its execution data stored in the memory. Also, the operation termination state may be the hibernation state in which the execution conditions are stored in the magnetic disk, or the sleep state or standby state in which the low power consumption is made with the execution data stored in the register or memory of the processor part 250 (CPU, etc.). Also, the operation termination state may be the state in which the display on the display unit 400 is terminated.

Also, the operation termination state may be the state in which a power consumption is lower than the normal operation in which information is processed in accordance with inputs of the user by terminating or reducing the supply of electric power to part of a mother board of the information processing apparatus 10. The operation termination state may be the state in which the supply of electric power to the processor part 250 and the input part 240 is terminated when no external power source is connected. When the external power source is connected, the operation termination state may be a sleep mode in which the input part 240 accepts only the input to the function extension key 310 and the switch 215. Also, the operation termination state may be the power-off state in which the operation of the operating system is not started.

If it is determined that the external power source (AC adapter, etc.) for operating the information processing apparatus 10 is connected (S100: YES), the controller part 222 turns on the power supply to the input part 240 and the execution part 230 (S105). Subsequently, the execution part 230 sets the software scan circuit 260 in a sleep mode of accepting only the inputs to the function extension key 310 and the switch 215 (S110). And the execution part 230 and the input part 240 of the software scan circuit 260 make the detection of an input from the user and the processing (S200: see FIG. 5 in more detail). Subsequently, the information processing apparatus 10 transfers to step S150.

On the other hand, if it is determined that the external power source (AC adapter, etc.) for operating the information processing apparatus 10 is connected (S100: NO), the controller part 222 detects whether or not the connection part 210 is turned from open state to closed state, using the switch 215, and determines whether or not an input to the function extension key 310 is accepted (S130). When accepting an input to the function extension key 310 or the switch 215 (S130: YES), the controller part 222 starts the supply of electric power to the software scan circuit 260 while preserving the operation termination state (S140), and sends to the software scan circuit 260 the information indicating whether or not an input to the function extension key 310 and the switch 215 is accepted. Subsequently, the execution part 230 and the input part 240 of the software scan circuit 260 make the detection of an input from the user and the processing (S200). Then, the information processing apparatus 10 transfers to step S150. On the other hand, referring back to step S130, if the controller part 222 accepts no input to the function extension key 310 and the switch 215 (S130: NO), the information processing apparatus 10 returns to step S100 and continues the operation.

If it is determined that the execution part 230 is connected to the external power source for operating the information processing apparatus 10 (S150: YES), the information processing apparatus 10 transfers to step S110. On the other hand, if it is determined that the execution part 230 is not connected to the external power source for operating the information processing apparatus 10 (S150: NO), the execution part 230 sends an instruction for turning off the power supply to the input part 240 and the execution part 230 (S160), whereby the power supply to the input part 240 and the execution part 230 is turned off (S170) and the operation returns to step S130.

In this manner, the controller part 222 accepts an input to the switch 215 other than the electric power button and the function extension key 310 in the operation termination state where the operation of the processor part 250 and the operating system 252 is terminated, and starts the operation of the execution part 230 and the input part 240 while preserving this operation termination state.

Figure 5:
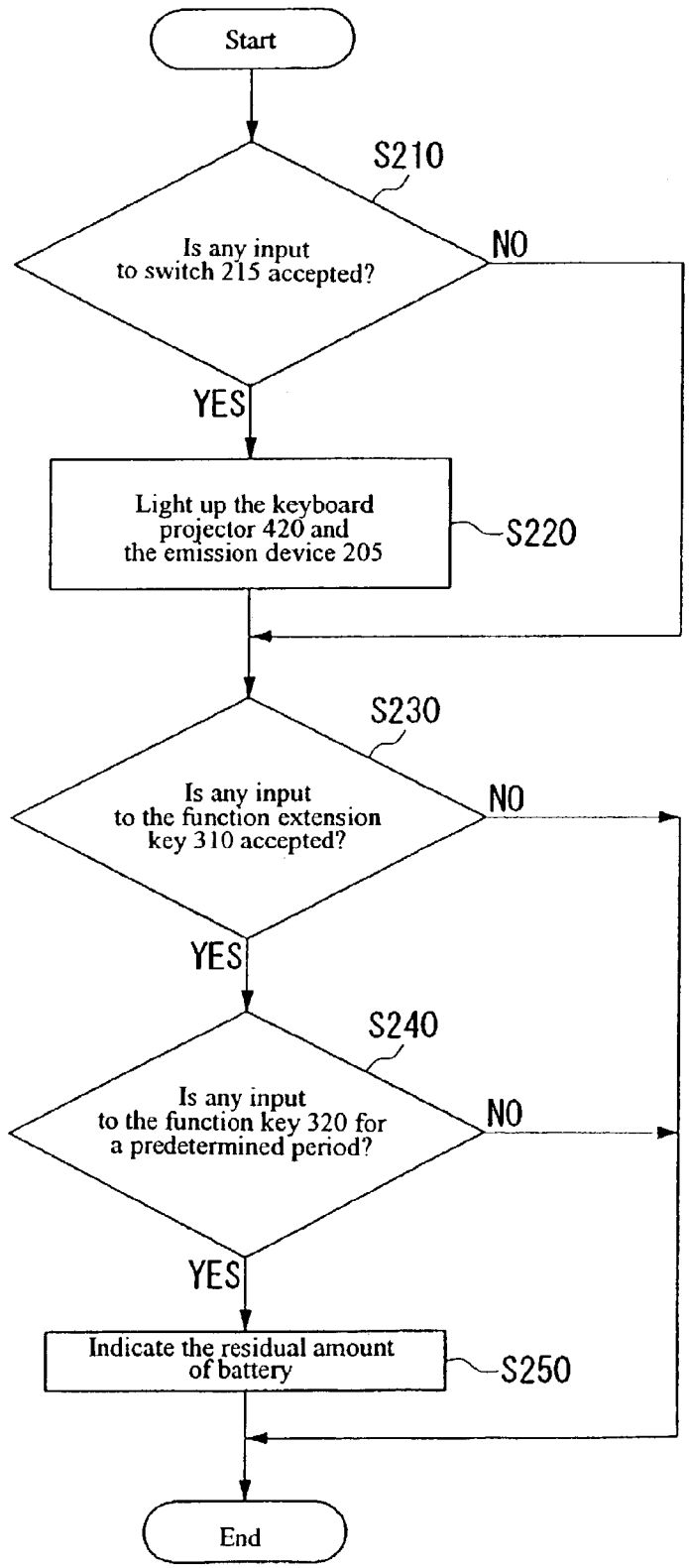
FIG. 5 is a flowchart of an input process.

FIG. 5 is a flowchart showing the input and processing at step S200 in FIG. 4. The execution part 230 receives from the controller part 222 the information indicating whether or not an input to the switch 215 is accepted. If the controller part 222 determines that the input to the switch 215 is accepted (S210: YES), the execution part 230 lights the keyboard projector 420 for illuminating the keyboard 30 and the emission device 205 indicating the position of the electric power button to the user (S220).

If the controller part 222 determines that an input to the function extension key 310 is accepted (S230: YES), the execution part 230 receives from the controller part 222 the information indicating whether or not the input to the function extension key 310 is accepted. The software scan circuit 260 transits from the sleep mode to the normal mode. And the input part 240 accepts an input to a plurality of keys on the keyboard 30 for a predetermined period. If the input part 240 accepts the input to the function extension key 310 and the function key 320 (S240: YES), the execution part 230 executes a process corresponding to a combination of the function extension key 310 and the function key 320, namely, a processing of indicating a residual amount of battery for driving the information processing apparatus 10 to the user (S250). The input part 240 determines that the input is accepted for this period even when the key is depressed before this period.

The processing of the execution part 230 is not limited to the above one. For example, the execution part 230 may execute a processing of adjusting the output volume of the information processing apparatus 10 corresponding to an input key, a processing of terminating the output of image to the display unit 400, and a processing of selecting whether the image data is output via an output terminal to the outside.

In this way, the information processing apparatus 10 can perform a processing associated with the input switch and key while preserving the operation termination state in which the operating system is not operating.

FIG. 6 is a table listing a residual amount of battery that the execution part 230 indicates with the keyboard 30. In the operation state in which the operating system is operative, the keyboard emission devices 300a to 300e are lighted up in accordance with the operation of the hard disk, input to the number lock key, input to the caps lock key, input to the scroll lock key, and the status of supplying electric power to the information processing apparatus 10 as a whole. On the other hand, in the operation termination state in which the operation of the operating system is terminated, the execution part 230 executes the process of indicating a residual amount of battery by a combination of lighting the keyboard emission devices 300a to 300e. For example, if the keyboard emission devices 300a to 300e are lighted (on), unlighted (off), unlighted (off), unlighted (off) and unlighted (off), the execution part 230 indicates that the current residual amount of battery is 50 to 20% of the marginal capacity. In this way, the information processing apparatus 10 can indicate the residual amount of battery to the user, utilizing effectively the function of lighting the keyboard emission devices 300a to 300e on the keyboard.

As obvious from this embodiment, the information processing apparatus 10 can accept a user's operation while keeping the operation termination state where operations of the processor part 250 and the operating system 252 etc. are terminated. In this time, the information processing apparatus 10 uses the hardware logic circuit 220 with lower electric power consumption than the software scan circuit 260. Therefore, the information processing apparatus 10 can accept the user's operation while keeping the low electric power consumption state.

In addition, the information, processing apparatus 10 can accept the key input from a user and can execute upon accepting the above operation the processing in connection with the key input while keeping the operation termination state. Therefore, the information processing apparatus 10 can respond to requests of users promptly while keeping the operation termination state in the low electric power consumption and can execute processing to provide information for helping the user operation and information for improving availability of users.

With the above embodiments of the invention, the information processing apparatus and the control method as stated in the following items are realized.

In the drawings and specifications there has been set forth a preferred embodiment of the invention and, although specific terms are used, the description thus given uses terminology in a generic and descriptive sense only and not for purposes of limitation.

While the present invention has been described with respect to the embodiment of the invention, the technical scope of the present invention is not limited to the described embodiment. Various changes and modifications may be made in the described embodiment. As is apparent from the description in the appended claims, modes of the present invention characterized by such changes and modifications are also included in the technical scope of the invention.

We claim as our invention:

1. An apparatus comprising:
an electric power button which starts operation of an operating system when input is received from a user;
a controller energized in response to user input to said power button and responsive to an input received through a switch other than said electric power button while in one of a plurality of termination states in which the operation of the operating system is terminated;
a keyboard including a plurality of keys;
a plurality of emission devices which are turned on in response to each-key input while in an operation state where the operating system is started; and
an executor, coupled to said controller, which performs a predetermined process while preserving the termination state in which the operating system is in when the input to the switch is accepted by said controller in the termination state in which the operating system is in, wherein the predetermined process performed by the executor is one or more of the group of:
indicating the position of said electric power button to the user;
lighting a projector for illuminating said keyboard; or
indicating a residual amount of the remaining battery capacity by turning on a pre-designated combination of said emission devices.

2. The apparatus of claim 1, wherein said termination states are a state selected from the group consisting of suspended, hibernation, sleep, standby and a low power state.

3. The apparatus of claim 1, further comprising: firmware which enables said executor to execute the predetermined process.

4. The apparatus of claim 1, wherein the predetermined process performed by said executor is the process of indicating the position of said electric power button to the user.

5. The apparatus of claim 1, wherin a keyboard.accepts a second input to said which the keyboard accepts a second input provided by a user,
and the predetermined process performed by said executor is the process of lighting a projector for illuminating said keyboard.

6. The apparatus of claim 1, wherein the predetermined process performed by said executor is the process of indicating to the user a residual amount of battery capacity remaining for powering said apparatus, based on an indicated termination state.

7. The apparatus of claim 1, wherein said executor while in the termination state performs a process which indicates a residual amount of the remaining battery capacity by turning on a pre-designated combination of said emission devices.

8. The apparatus of claim 7, wherein each of said termination states is a state selected from the group consisting of suspended, hibernation, sleep, standby and low power state.

9. The apparatus of claim 1, further comprising:
a keyboard including a plurality of keys;
a switch used as a first key that is predetermined among the plurality of keys; and
an inputter which accepts keyed input to a second key that is predetermined among the plurality of keys; wherein said controller accepts an input to the first key, wherein said executor performs a process associated with the second key when said input accepts keyed input to the second key.

10. The apparatus of claim 9, wherein said inputter accepts keyed input to the second key for a predetermined period, when accepting keyed input to the first key.

11. The apparatus of claim 9, wherein said controller supplies power to said input, when accepting keyed input to the first key, and said executor terminates power supplied to said inputter, when the processing associated with the second key is completed.

12. The apparatus of claim 9, wherein said inputter accepts keyed input to two predetermined keys among said plurality of keys, when detecting keyed input to the first key, and said executor performs a process associated with a combination of the two keys.

13. A method comprising the steps of:
accepting an input to a switch other than an electric power button of an information processing apparatus while in one of an operation termination state in which operation of an operating system is terminated; and
executing a predetermined processing while preserving the operation termination state in which it was in when accepting the input to the switch in one of said operation termination states, wherein the predetermined process is one or more of the group of:
indicating the position of said electric power button to a user;
lighting a projector for illuminating said keyboard; or
indicating a residual amount of the remaining battery capacity of the information processing apparatus.

14. The method of claim 13, wherein said one of said termination states is a state selected from the group consisting of suspended, hibernation, sleep, standby and a low power state.

15. A method comprising the steps of:
detecting a pressing of a predetermined key when a processing part and an input part are in one of a plurality of termination states; and
moving the input part to an operational state while preserving said processor part in the termination state it was in when the pressing of the predetermined key is detected, wherein moving the input part to an operational state comprises performing one or more of the following processes:
indicating the position of an electric power button to a user;
lighting a projector for illuminating a keyboard; or
indicating a residual amount of the remaining battery capacity of a computing apparatus.

16. The method of claim 15, wherein said termination state is a state selected from the group consisting of suspended, hibernation, sleep, standby and a low power state.

17. An apparatus comprising:
an electric power button which starts operation of an operating system when input is received from a user;
a controller energized in response to user input to said power button and responsive to an input received through a switch other than said electric power button while in one of a plurality of termination states in which the operation of the operating system is terminated;

a keyboard including a plurality of keys;

a switch used as a first key that is predetermined among the plurality of keys;

an inputter which accepts keyed input to a second key that is predetermined among the plurality of keys;

an executor, coupled to said controller, which performs a predetermined process while preserving the termination state in which the operating system is in when the input to the switch is accepted by said controller in the termination state in which the operating system is in, wherein said controller accepts an input to the first key and supplies power to said input when accepting keyed input to the first key and said executor terminates power supplied to said inputter when a process associated with the second key is completed.

18. The apparatus of claim 17, wherein said termination states are a state selected from the group consisting of suspended, hibernation, sleep, standby and a low power state.

19. The apparatus of claim 17, further comprising: firmware which enables said executor to execute the predetermined process.

20. The apparatus of claim 17, wherein each of said termination states is a state selected from the group consisting of suspended, hibernation, sleep, standby and a low power state.

* * * * *